US012633099B2

(12) United States Patent (10) Patent No.: US 12,633,099 B2
Kumari et al. (45) Date of Patent: May 19, 2026

(54) FINE-TUNING AND CONTROLLING DIFFUSION MODELS

(71) Applicant: ADOBE INC., San Jose, CA (US)

(72) Inventors: Nupur Kumari, Pittsburgh, PA (US);
Richard Zhang, Burlingame, CA (US);
Junyan Zhu, Pittsburgh, PA (US); **Elya
Shechtman**, Seattle, WA (US)

(73) Assignee: ADOBE INC., San Jose, CA (US)

( * ) Notice: Subject to any disclaimer, the term of this
patent is extended or adjusted under 35
U.S.C. 154(b) by 417 days.

(21) Appl. No.: 18/062,314

(22) Filed: Dec. 6, 2022

(65) Prior Publication Data

US 2024/0185588 A1 Jun. 6, 2024

(51) Int. Cl.
*G06V 10/778* (2022.01)
*G06V 10/75* (2022.01)
*G06V 10/774* (2022.01)

(52) U.S. Cl.
CPC .......... *G06V 10/778* (2022.01); *G06V 10/751*
(2022.01); *G06V 10/774* (2022.01)

(58) Field of Classification Search
CPC .. G06V 10/778; G06V 10/751; G06V 10/774;
G06V 10/82; G06N 3/0455; G06N
3/0464; G06N 3/088; G06T 11/00
See application file for complete search history.

(56) References Cited

U.S. PATENT DOCUMENTS

| | | | | |
|---|---|---|---|---|
| 2022/0222470 A1* | 7/2022 | Hropak | .................. | G06V 20/41 |
| 2023/0177810 A1* | 6/2023 | Xu | ........................ | G06V 10/774 |
| | | | | 382/159 |
| 2024/0171788 A1* | 5/2024 | Kreis | ............. | H04N 21/234363 |

OTHER PUBLICATIONS

Saharia, Chitwan, et al. "Photorealistic Text-to-Image Diffusion
Models with Deep Language Understanding." arXiv preprint
arXiv:2205.11487 (2022).https://arxiv.org/abs/2205.11487 (Year:
2022).*
Ruiz, Nataniel, et al. "Dream Booth: Fine Tuning Text-to-Image
Diffusion Models for Subject-Driven Generation." arXiv preprint
arXiv:2208.12242 (2022).https://arxiv.org/abs/2208.12242v1 (Year:
2022).*
Hertz, Amir, et al. "Prompt-to-prompt image editing with cross
attention control." arXiv preprint arXiv:2208.01626 (2022).https://
arxiv.org/abs/2208.01626 (Year: 2022).*
Gal, et al. "An Image is Worth One Word: Personalizing Text-to-
Image Generation using Textual Inversion", arXiv preprint arXiv:2208.
01618v1 [cs.CV] Aug. 2, 2022, 26, pages.
Liu, et al., "Towards Faster and Stabilized GAN Training For
High-Fidelity Few-Shot Image Synthesis", arXiv preprint arXiv:2101.
04775v1 [cs.CV] Jan. 12, 2021, 22 pages.

(Continued)

*Primary Examiner* — Han Hoang
(74) *Attorney, Agent, or Firm* — F. CHAU &
ASSOCIATES, LLC

(57) ABSTRACT

Systems and methods for fine-tuning diffusion models are
described. Embodiments of the present disclosure obtain an
input text indicating an element to be included in an image;
generate a synthetic image depicting the element based on
the input text using a diffusion model trained by comparing
synthetic images depicting the element to training images
depicting elements similar to the element and updating
selected parameters corresponding to an attention layer of
the diffusion model based on the comparison.

19 Claims, 12 Drawing Sheets

(56)           References Cited

OTHER PUBLICATIONS

Ramesh, et al., "Hierarchical Text-Conditional Image Generation with CLIP Latents", arXiv preprint arXiv preprint arXiv:2204. 06125v1 [cs.CV] Apr. 13, 2022, 27 pages.

Rombach, et al., "High-Resolution Image Synthesis with Latent Diffusion Models", arXiv preprint arXiv:2112.10752v2 [cs.CV] Apr. 13, 2022, 45 pages.

Ruiz, et al., "DreamBooth: Fine Tuning Text-to-Image Diffusion Models for Subject-Driven Generation", arXiv preprint arXiv:2208. 12242v1 [cs.CV] Aug. 25, 2022, 21 pages.

Saharia, et al., "Photorealistic Text-to-Image Diffusion Models with Deep Language Understanding", arXiv preprint arXiv:2205. 11487v1 [cs.CV] May 23, 2022, 46 pages.

* cited by examiner

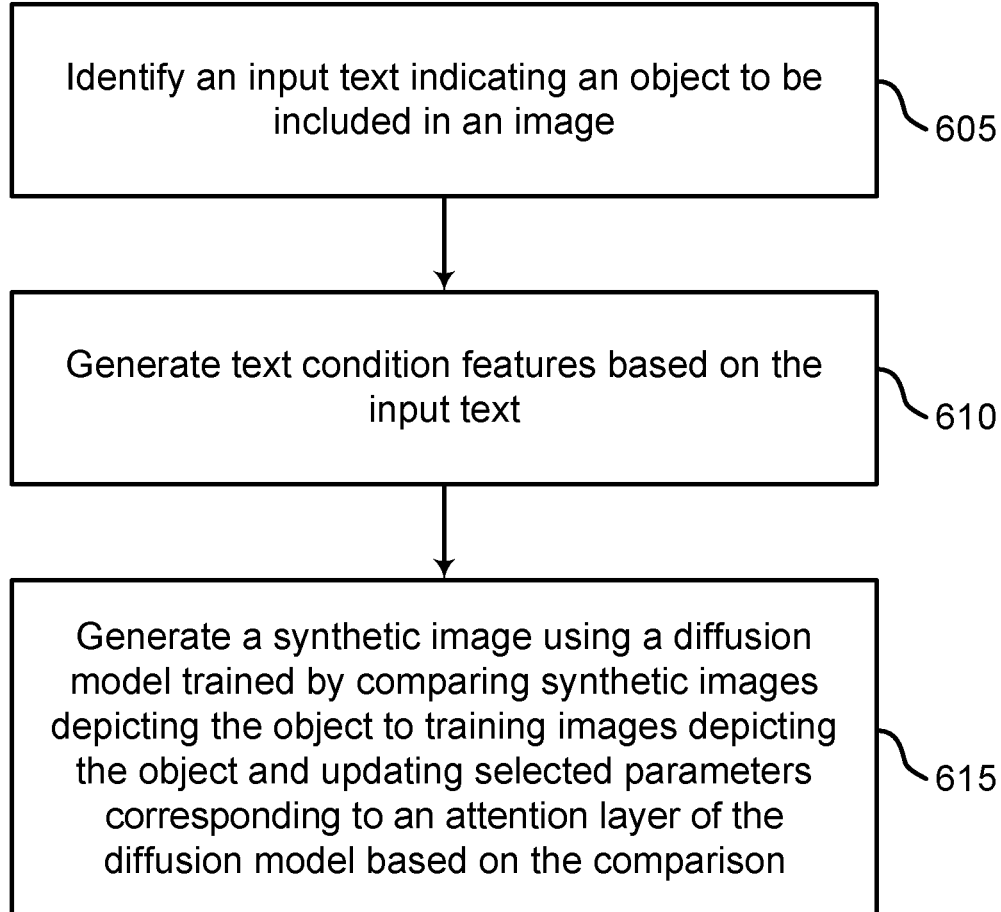

Identify an input text indicating an object to be included in an image

605

Generate text condition features based on the input text

610

Generate a synthetic image using a diffusion model trained by comparing synthetic images depicting the object to training images depicting the object and updating selected parameters corresponding to an attention layer of the diffusion model based on the comparison

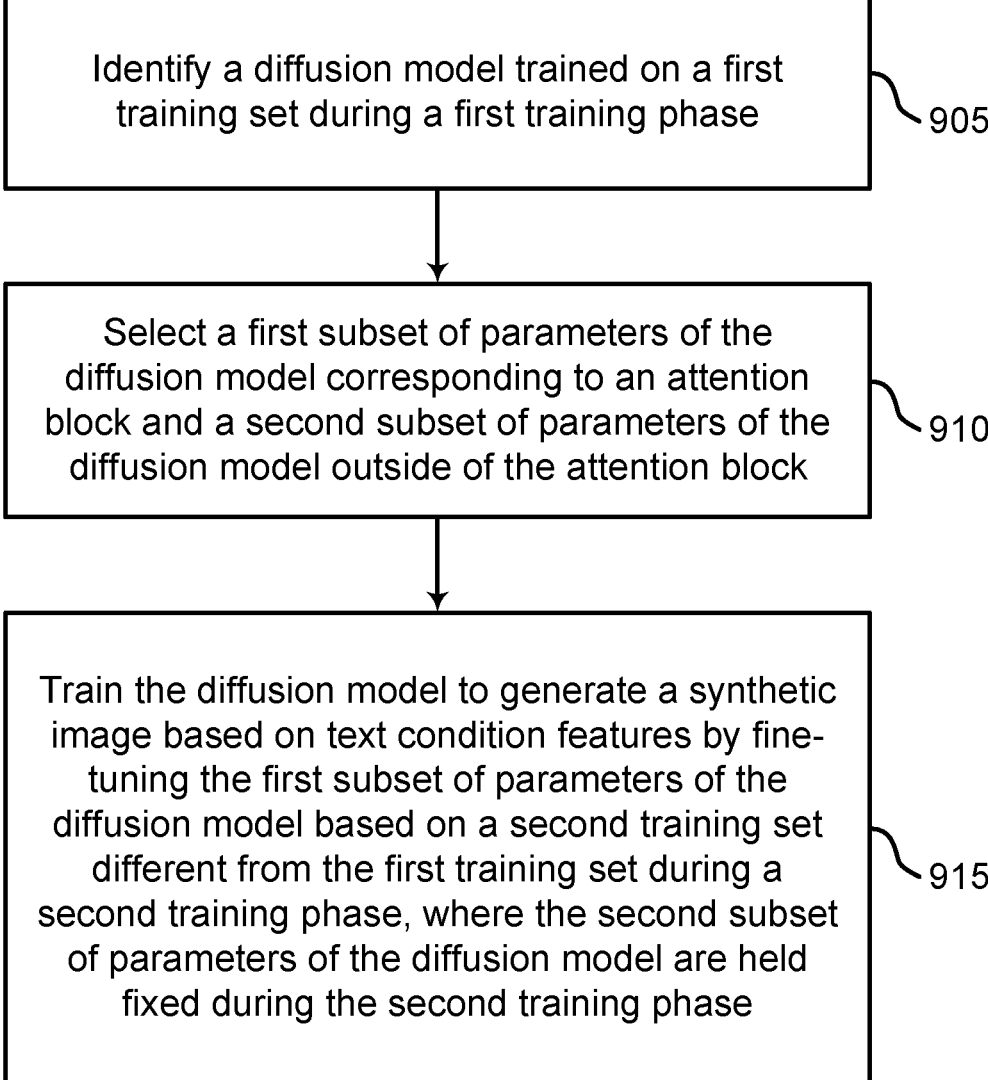

Identify a diffusion model trained on a first training set during a first training phase

905

Select a first subset of parameters of the diffusion model corresponding to an attention block and a second subset of parameters of the diffusion model outside of the attention block

910

Train the diffusion model to generate a synthetic image based on text condition features by fine-tuning the first subset of parameters of the diffusion model based on a second training set different from the first training set during a second training phase, where the second subset of parameters of the diffusion model are held fixed during the second training phase

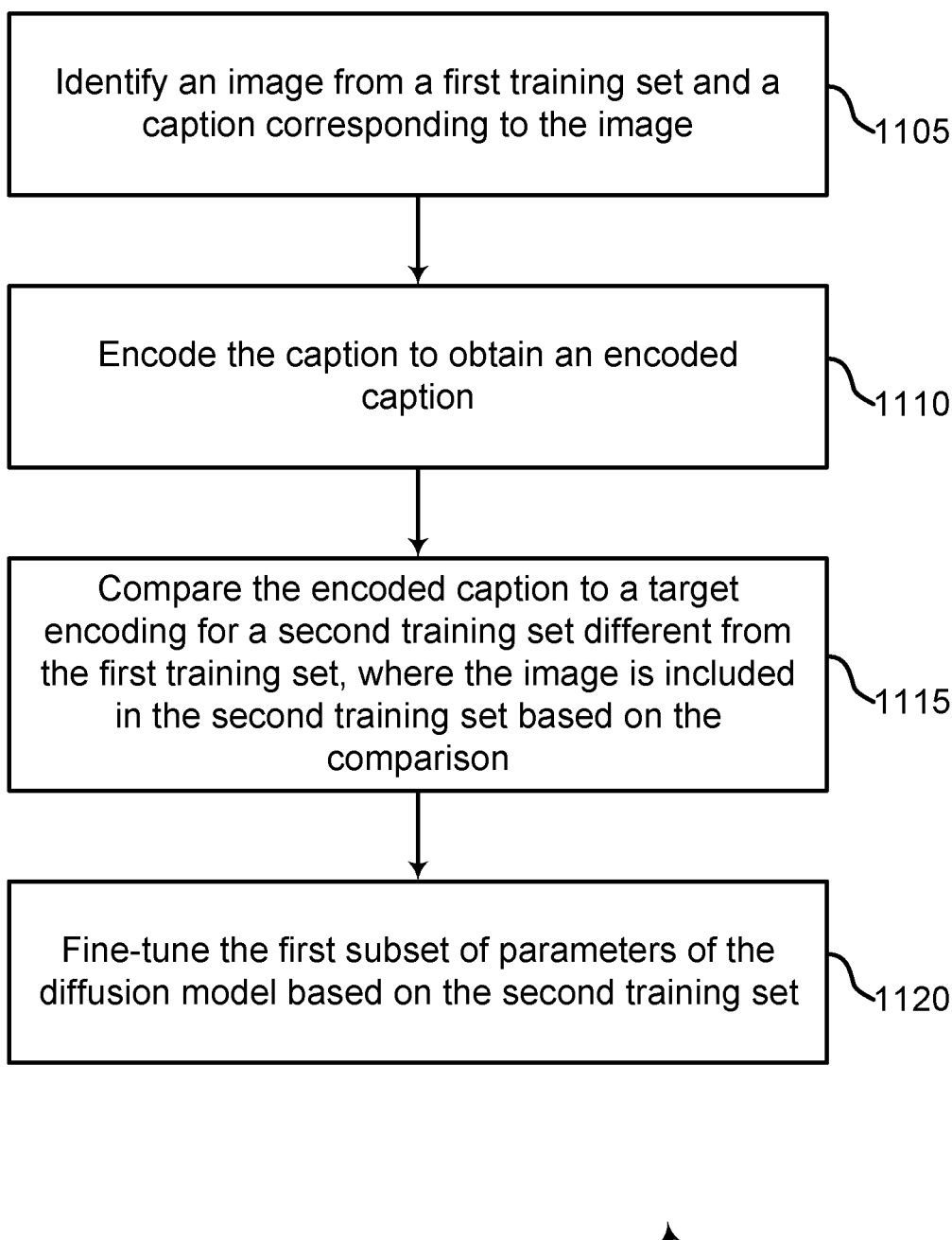

Identify an image from a first training set and a caption corresponding to the image ⌐1105

Encode the caption to obtain an encoded caption ⌐1110

Compare the encoded caption to a target encoding for a second training set different from the first training set, where the image is included in the second training set based on the comparison ⌐1115

Fine-tune the first subset of parameters of the diffusion model based on the second training set ⌐1120

FINE-TUNING AND CONTROLLING DIFFUSION MODELS

BACKGROUND

The following relates generally to machine learning for image generation. Machine learning models can be used for tasks such as increasing image resolution, image inpainting, and generating new synthetic images. Examples of generative models include generative adversarial networks (GANs), Hidden Markov Models (HMMs), and diffusion models.

Diffusion models are a class of generative neural networks which can be trained to generate new data with features similar to features found in the training data. These models iteratively add noise to data during a forward process then learn to recover the data by denoising the data during a reverse process. The denoising process is used at inference time to generate novel images from noisy images based on an external condition such as a text prompt. Latent diffusion models add and remove noise in a latent space representing image features rather than in the pixel space of the image itself.

SUMMARY

The present disclosure describes systems and methods for training diffusion models. Embodiments of the disclosure include fine-tuning a large-scale text-conditioned diffusion model to enable the model to generate images that include a new concept, for example, when a text prompt associated with the new concept is provided as a text input. The fine-tuning includes adjusting a subset of the model parameters using a few image examples of the concept as training data. For example, an image generation system including a diffusion model may receive an image of the new concept, generate a synthetic image, compare the received image to the synthetic image, and train the diffusion model by updating selected parameters based on the comparison.

In some cases, the selected parameters are parameters limited to attention blocks in the diffusion model. An attention block may include both cross-attention and self-attention components. In some cases, the selected parameters include the projection mappings of the cross-attention component.

A method, apparatus, non-transitory computer readable medium, and system for fine-tuning generative models are described. One or more aspects of the method, apparatus, non-transitory computer readable medium, and system include obtaining an input text indicating an element to be included in an image; generating a synthetic image depicting the element based on the input text using a diffusion model trained by comparing synthetic images depicting the element to training images depicting elements similar the element; and updating selected parameters corresponding to an attention layer of the diffusion model based on the comparison.

A method, apparatus, non-transitory computer readable medium, and system for fine-tuning generative models are described. One or more aspects of the method, apparatus, non-transitory computer readable medium, and system include identifying a diffusion model trained on a first training set during a first training phase; selecting a first subset of parameters of the diffusion model corresponding to an attention block and a second subset of parameters of the diffusion model outside of the attention block; and training the diffusion model to generate a synthetic image based on text condition features by fine-tuning the first subset of parameters of the diffusion model based on a second training set different from the first training set during a second training phase, wherein the second subset of parameters of the diffusion model are held fixed during the second training phase.

An apparatus, system, and method for fine-tuning generative models are described. One or more aspects of the apparatus, system, and method include a processor; a memory including instructions executable by the processor; a text transformer configured to generate text condition features from an input text; an image selection component configured to select images related to the input text; and a diffusion model configured to generate synthetic images based on the text condition features, wherein the diffusion model is trained by updating selected parameters corresponding to one or more attention layers of the diffusion model.

BRIEF DESCRIPTION OF THE DRAWINGS

FIG. 6 shows an example of a method for fine-tuning a diffusion model according to aspects of the present disclosure.

FIG. 9 shows an example of a method for training a diffusion model in two training phases according to aspects of the present disclosure.

FIG. 11 shows an example of a method for selecting training data according to aspects of the present disclosure.

FIG. 12 shows an example of a computing device for generating synthetic images according to aspects of the present disclosure.

DETAILED DESCRIPTION

Figure 1:
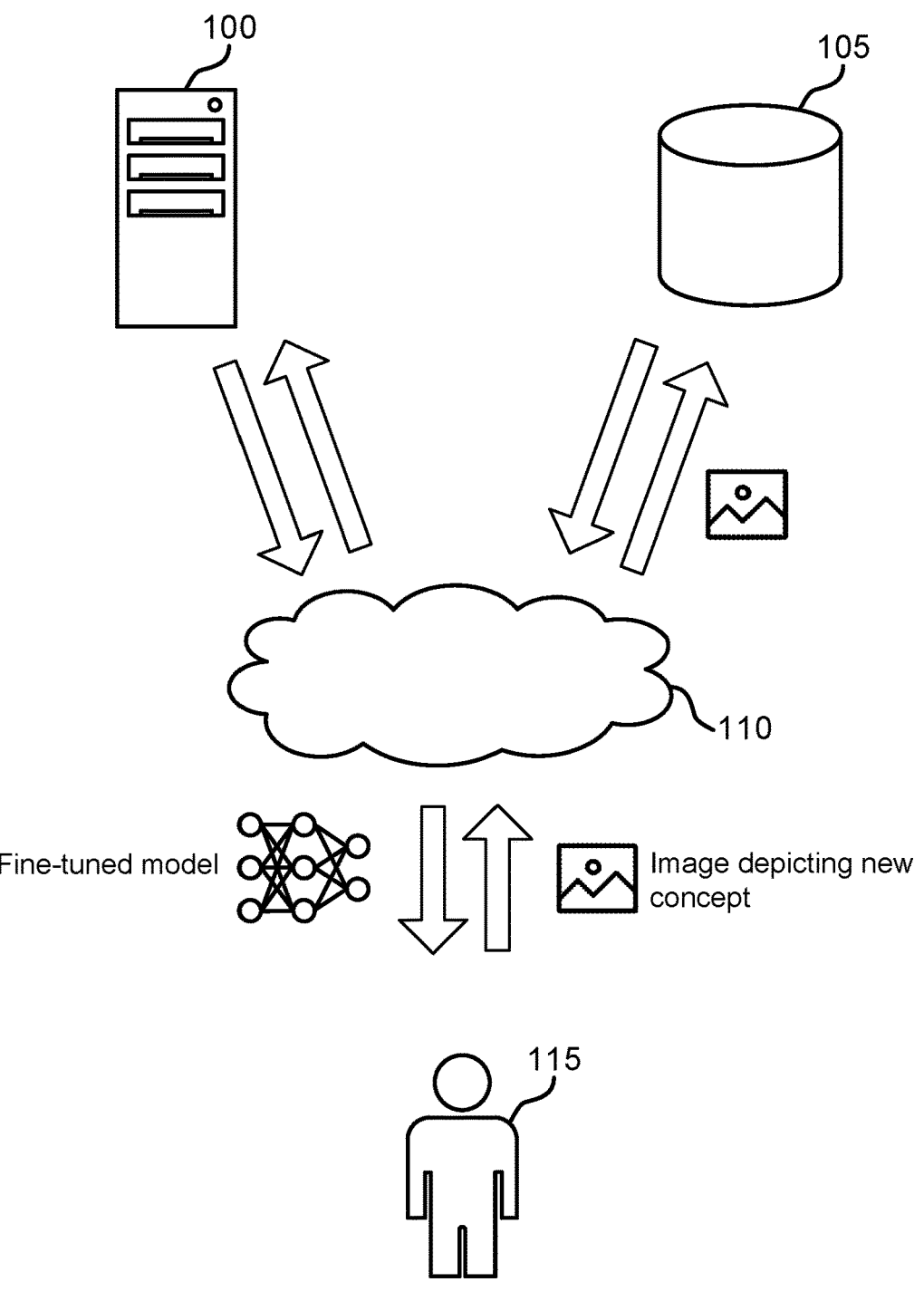
FIG. 1 shows an example of an image generation system according to aspects of the present disclosure.

The present disclosure describes systems and methods to fine-tune pretrained image generation models. Image generative models, including diffusion models, enable synthesis of coherent images from text prompts. Latent diffusion models are a subset of generative models that can combine multiple concepts in a text prompt and generate photorealistic images. Embodiments of the disclosures fine-tune a diffusion model to learn new concepts in a memory-efficient manner without forgetting previously learned concepts.

Techniques for fine-tuning diffusion models often include providing a new training dataset that includes new concepts, and then retraining the entire model (i.e., end-to-end training). For example, one approach generates a synthetic image of a new concept (e.g., based on text condition including the concept), compares the synthetic image to a ground truth image, and then updates all parameters of the diffusion model end-to-end based on this comparison. This approach can be effective for learning new concepts; however, training all parameters takes increased compute time, and the entire model is stored in the process, which may use several gigabytes of data.

As an alternative to the end-to-end training approach described above, some systems selectively optimize an embedding of an input text. These systems fix the parameters corresponding to one word of the input text in a training phase in an attempt to learn the concept represented in that word. However, these techniques may not consider the interdependencies between words, which results in a model that cannot combine the new concept with any peripheral ideas, such as stylization. For example, a model can learn what a photo of a "green plushie frog" is, but may not retain features of the frog when prompted with "green plushie frog looking at the ocean." Furthermore, experimental data shows that optimizing only the embeddings of the diffusion model may not result in a model that can fully learn new concepts.

Both the end-to-end approach and the embedding approach can result in forgetting previous learning or overfitting on new training data. Forgetting is a problem in machine learning models in which the model is unable to generate or predict features previously within its scope (e.g., information within the original training set). Overfitting is a problem in which the model can only produce or predict features from its training data; in other words, the model has overfit to the training data. When models are overfit to their training data, they are unable to generate meaningfully new information.

In contrast to conventional approaches, embodiments of the present disclosure update selected parameters of a diffusion model while learning additional concepts. For example, embodiments hold parameters outside a selected attention block of the diffusion model fixed while fine-tuning. Experimental data shows that the information learned in the attention block(s) during fine-tuning allows for the learning of new concepts and peripheral concepts such as stylization, while avoiding overfitting and increasing memory efficiency. For example, by adjusting the projection matrices of the attention block(s) and holding other parameters fixed during training, only these matrices need to be stored after updating, which corresponds to ~75 MB of data, or 10-15 MB after compression. During fine-tuning, some embodiments include data from the original training data that is related to the new concept, so that the original concepts are not forgotten.

As used herein, "fine-tuning" refers to the adjustment of a pre-trained machine learning model by applying an additional training phase to the model with new training data. The new training data may include new concepts that the model has not yet learned. In this context of image synthesis, a "concept" refers to an element or idea that the generative model can reproduce based off an initial condition that is representative of the element or idea. Such elements include objects, people, pets, style properties ("photorealistic", "cartoon", etc.), and other aspects. In one illustrative example, a diffusion model may be fine-tuned to learn about the concept of a "moongate," a decorative architectural feature used in some gardens.

Figure 2:
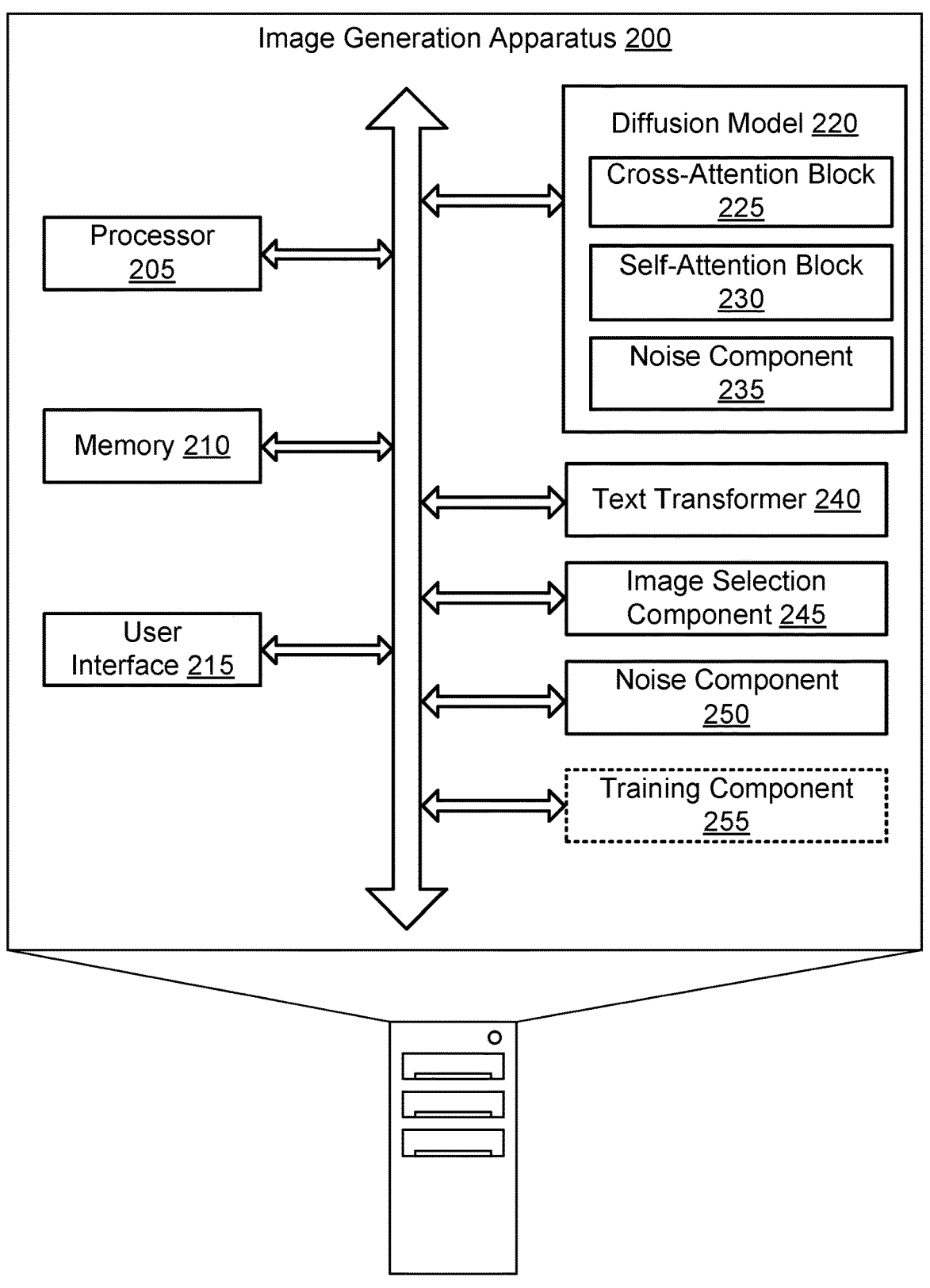
FIG. 2 shows an example of an image generation apparatus according to aspects of the present disclosure.
Figure 3:
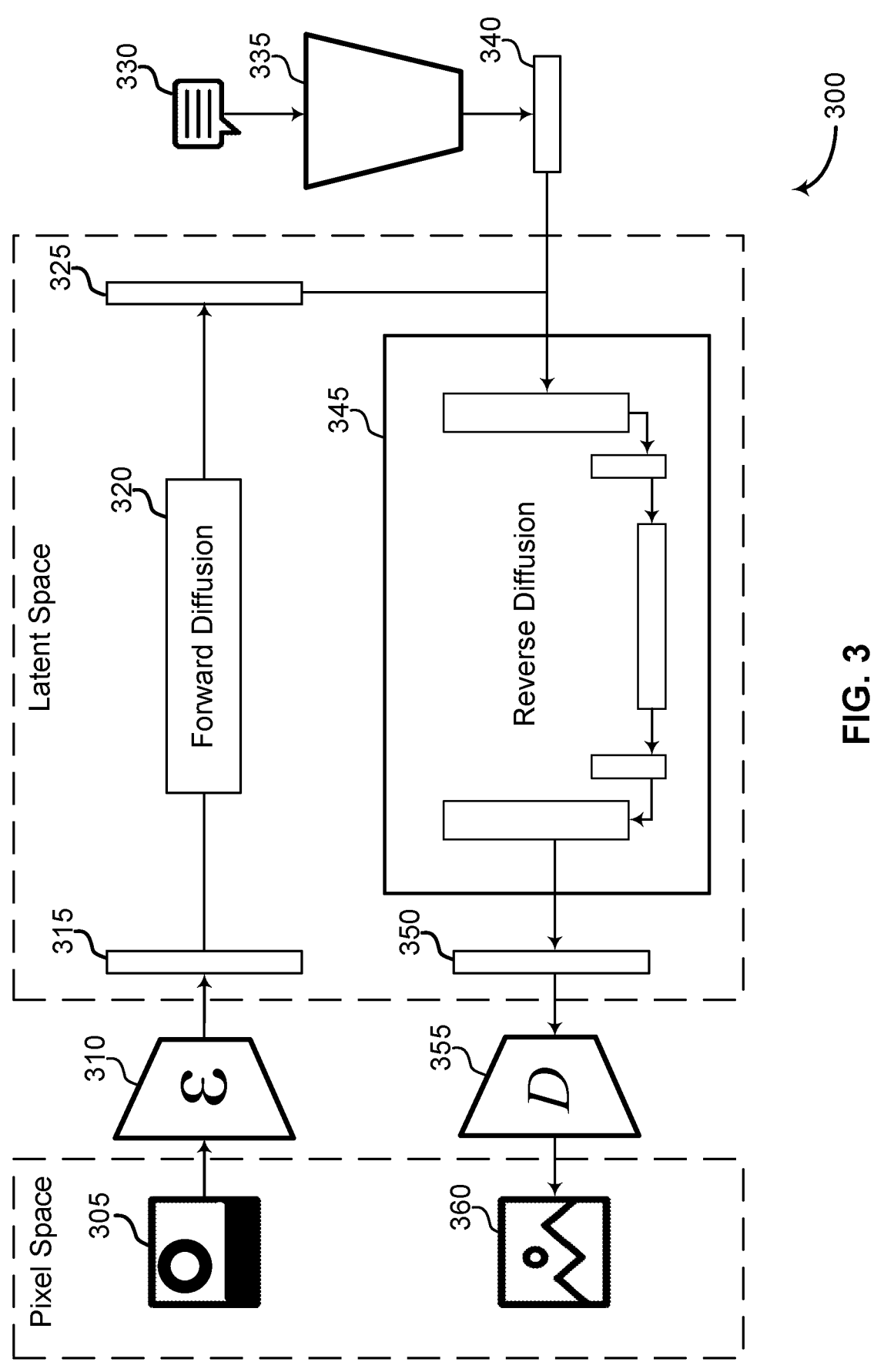
FIG. 3 shows an example of a latent diffusion model according to aspects of the present disclosure.

Details regarding the architecture of an image generation apparatus are provided with reference to FIGS. 1-3. Examples for using the diffusion model to generate images are described with reference to FIGS. 4-5. Examples for fine-tuning the diffusion model, including selecting data for first and second training phases, are provided with reference to FIGS. 6-11. A computing device used to implement the image generation apparatus is described with reference to FIG. 12.

Image Generation System

An apparatus for fine-tuning generative models is described. One or more aspects of the apparatus, system, and method include a processor; a memory including instructions executable by the processor; a text transformer configured to generate text condition features from an input text; an image selection component configured to select images related to the input text; and a diffusion model configured to generate synthetic images based on the text condition features, wherein the diffusion model is trained by updating selected parameters corresponding to one or more attention layers of the diffusion model.

Some examples of the apparatus, system, and method further include a noise component configured to add noise to images and image features. Some examples further include a text transformer configured to generate text condition features from an input text.

In some aspects, the diffusion model comprises a latent diffusion model. In some aspects, the diffusion model comprises a U-net architecture. In some aspects, the selected parameters are limited to cross-attention blocks, self-attention blocks, or both.

FIG. 1 shows an example of an image generation system according to aspects of the present disclosure. The example shown includes image generation apparatus 100, database 105, network 110, and user 115.

Image generation apparatus 100 includes components configured to implement the methods and techniques described herein. In an example process, user 115 provides an image that depicts an element that is inaccurately represented by a diffusion model of image generation apparatus 100. For example, user 115 may provide an image of a "moongate," which is an ornate circular gate that can be found at entrances to gardens and temples. In this example, neither the image of the moongate nor the label "moongate" were included in the original training data for the diffusion model of image generation apparatus 100. Accordingly, image generation apparatus 100 is, at this point, unable to accurately synthesize new images for moongates.

User 115 may provide the image by, for example, uploading the image through network 110 or identifying it on database 105. Image generation apparatus 100 may then synthesize its current "best guess" image for the moongate, compare the synthesized image to the provided image, and update its diffusion model using the comparison and while holding selected parameters fixed. Then, the system may provide either the fine-tuned model to the user, or use the fine-tuned model to generate a new synthesized image that is accurate to the new concept provided by the user.

Image generation apparatus 100 may be implemented on a server. For example, one or more components of image generation apparatus 100 may be implemented on one or more servers connected by network 110. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Image generation apparatus 100 may store parameters, image data, and other information on an internal memory, or may store the information on database 105. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, user 115 interacts with the database controller. In other cases, the database controller may operate automatically without user interaction.

Network 110 facilitates the transfer of information between user 115, database 105, and image generation apparatus 110. Network 110 can be referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, image generation apparatus 100 identifies an image including an element that is depicted inaccurately by a diffusion model. In some aspects, image generation apparatus 100 identifies a diffusion model trained on a first training set during a first training phase. In some examples, image generation apparatus 100 identifies an image from the first training set. In some examples, image generation apparatus 100 identifies an image from the first training set and a caption corresponding to the image. Image generation apparatus 100 may update its parameters during a first training phase based on the image and the caption. In an example, image generation apparatus 100 may train in a second training phase based on images from a second training set. In some cases, image generation apparatus 100 select images from the first training set based on a computed similarity score between the images from the first set and images from the second set. Image generation apparatus 100 is an example of, or includes aspects of, the corresponding element described with reference to FIG. 2.

FIG. 2 shows an example of an image generation apparatus 200 according to aspects of the present disclosure. The example shown includes image generation apparatus 200, processor 205, memory 210, user interface 215, diffusion model 220, text transformer 240, image selection component 245, noise component 235, and training component 250.

Processor 205 executes instructions which implement components of image generation apparatus 200. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. The memory array may be within a memory located on image generation apparatus 200, such as memory 210, or may be included in an external memory. In some embodiments, the memory controller is integrated into processor 205. Processor 205 is configured to execute computer-readable instructions stored in memory 210 to perform various functions. In some embodiments, processor 205 includes special purpose components for modem processing, baseband processing, digital signal processing, or transmission processing.

Memory 210 stores instructions executable by processor 205, and may further be used to store data such as diffusion model parameters, latent representations, and image data. Memory 210 may work with a database as described with reference to FIG. 1 to provide storage for image generation apparatus 200. Memory 210 includes one or more memory devices. Examples of a memory device include random access memory (RAM), read-only memory (ROM), or a hard disk. Further examples include solid state memory and a hard disk drive. In some examples, memory is used to store computer-readable, computer-executable software including instructions that, when executed, cause processor 205 to perform various functions described herein. In some cases, memory 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

User interface 215 allows a user to input or specify an image or label corresponding to a new concept. The new concept, for example, may be a labeled image for fine-tuning diffusion model 220. Image generation apparatus 200 may provide an interface for the fine-tuned model or a synthesized image via user interface 215. A user interface may enable a user to interact with a device. In some embodiments, the user interface may include an audio device, such as an external speaker system, an external display device such as a display screen, or an input device (e.g., remote control device interfaced with user interface 215 directly or through an IO controller module). In some cases, a user interface may be a graphical user interface (GUI).

Diffusion model 220 is a generative model used to synthesize new image data. In one aspect, diffusion model 220 includes cross-attention block 225, self-attention block 230, and noise component 235. Cross-attention block 225 is an example of, or includes aspects of, the corresponding element described with reference to FIG. 10. An example of diffusion model 220 will be described in greater detail with reference to FIG. 3.

In an example training process, diffusion model 220 may receive a training image. In some examples, diffusion model 220 encodes the training image to obtain image features. Noise component 235 is used to add noise to the image features to obtain noisy image features. In some examples, diffusion model 220 generates de-noised image features from the noisy image features using noise component 235. In some examples, diffusion model 220 decodes the de-noised image features to obtain the synthetic image, which training component 255 compares to the original image to update parameters of diffusion model 220.

In an example inference process, diffusion model 220 may receive an input text, and generate text features from the input text by encoding the text. The text features may be referred to as a "text condition." At inference, diffusion model 220 may generate an initial vector of noisy image features, then gradually denoise the vector while considering information from the text condition to synthesize a novel image corresponding to the text condition.

Self-attention block 230 may be a layer or set of layers included in the denoising pipeline of diffusion model 220. Self-attention is a technique used in machine learning that measures the influence of all input sequence members with each other, and modifies their corresponding outputs through weights. The self-attention layers are trained to weigh an input sequence in such a way that each member of the sequence provides useful context, thereby increasing accuracy at inference time.

Cross-attention block 225 may be a layer or set of layers included in the denoising pipeline of diffusion model 220. Cross-attention is a technique used in machine learning to asymmetrically combine different embeddings of the same dimension and measure their influence ("attention") on each other. Unlike self-attention, cross-attention allows the model to learn the influence of the different embeddings on each other, instead of just the members of one embedded sequence on itself.

Attention blocks are used in transformer networks, such as text transformer 240. Text transformer 240 is used to embed an input text into a vector encoding that can be used by diffusion model 220. According to some aspects, text transformer 240 encodes a caption to obtain an encoded caption. According to some aspects, text transformer 240 is configured to generate text conditions from an input text. Text transformer 240 is an example of, or includes aspects of, the corresponding element described with reference to FIG. 3.

A transformer or transformer network is a type of neural network model used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

Text transformer 240 is configured to generate a word embedding from an input text or label. A word embedding is a learned representation for text where words that have the same meaning have a similar representation. GloVe and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words. In some cases, an embedding algorithm such as CLIP allows for multimodal embeddings, so that text embeddings and image embeddings can be compared in a common space.

According to some aspects, noise component 235 is configured to add noise to images or image features to obtain noisy image features. Noise component 235 may be used in a forward diffusion process to add noise to an image during, for example, a training phase to generate a noisy image. A noisy image may be defined as an image or image encoding that has an amount of random noise (for example, Gaussian noise) added to it. In some cases, the amount of added Gaussian noise results in an image or image encoding in which none of the original features of the image remain. Noise component 235 can also add computed noise to de-noise an image, similar to how active noise-cancelling headphones work. Noise component 235 may, for example, add computed noise to de-noise an image according to trained parameters of diffusion model 220 to form a de-noised image vector. The de-noised image vector can then be decoded to produce a synthesized image.

Image selection component 245 is used to select images for training diffusion model 220. For example, image selection component 245 can be used to select images used in a second training phase, i.e., a fine-tuning phase, of diffusion model 220. For example, image selection component 245 may select images from a first training set to include in a second training set used in the second training phase, where the images are selected based on their similarity to a target prompt or encoding.

According to some aspects, image selection component 245 identifies a semantic domain for improving performance of the diffusion model 220. In some examples, image selection component 245 selects a training set including images from the semantic domain, where the selected parameters of the diffusion model 220 are updated based on the training set.

According to some aspects, image selection component 245 identifies a semantic domain corresponding to a particular element, where the second training set includes a set of images representing the particular element. In some examples, image selection component 245 identifies a semantic domain corresponding to a class of elements, where the second training set includes a set of images representing the class of elements. According to some aspects, image selection component 245 is configured to select images related to an input text.

Training component 250 is used to train the diffusion model 220. For example, training component 250 may train diffusion model 220 in a first training phase, in which all trainable parameters of diffusion model 220 are updated based on a first training set. Additionally, training component 250 may train diffusion model 220 in a second training phase, in which selected parameters of diffusion model 220 are updated based on a second training set.

According to some aspects, training component 250 compares a synthetic image of a new concept to an original image of the new concept. In some examples, training component 250 updates selected parameters corresponding to an attention layer of the diffusion model 220 based on the comparison. In some examples, training component 250 holds additional parameters of the diffusion model 220 fixed while updating the selected parameters. In some aspects, the selected parameters are limited to a cross-attention block 225, a self-attention block 230, or both. In some aspects, the selected parameters are limited to a projection mapping matrix of a cross-attention block 225. In some aspects, the selected parameters are limited to a restricted set of parameters of the projection mapping matrix. In some aspects, the selected parameters are limited to selected resolution levels of a U-Net architecture.

According to some aspects, training component 250 selects a first subset of parameters of the diffusion model 220 corresponding to an attention block and a second subset of parameters of the diffusion model 220 outside of the attention block. In some examples, training component 250 fine-tunes the first subset of parameters of the diffusion model 220 based on a second training set different from the first training set during a second training phase, where the second subset of parameters of the diffusion model 220 are held fixed during the second training phase. In some examples, training component 250 compares an encoded image to a target encoding for the second training set, where the image is included in the second training set based on the comparison. In some examples, training component 250 compares an encoded caption for an image to a target encoding for the second training set, where the image is included in the second training set based on the comparison. In at least one embodiment, training component 255 is provided in an apparatus different from image generation apparatus 200.

FIG. 3 shows an example of a latent diffusion model 300 according to aspects of the present disclosure. The example shown includes latent diffusion model 300, starting image 305, encoder 310, image vector 315, forward diffusion block 320, noisy image vector 325, input text 330, text transformer 335, text condition vector 340, reverse diffusion block 345, synthesized image vector 350, decoder 355, and synthesized image 360. Text transformer 335 is an example of, or includes aspects of, the corresponding element described with reference to FIG. 2.

Diffusion models are a class of generative neural networks which can be trained to generate new data with features similar to features found in training data. In particular, diffusion models can be used to generate novel images. Diffusion models work by iteratively adding noise to the data during a forward process and then learning to recover the data by denoising the data during a reverse process. For example, a diffusion model can take an original image as input and repeatedly add Gaussian noise to the image until the image resembles pure noise. Next, the diffusion model gradually removes the noise from the noisy image to generate a new version of the original image. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Latent diffusion model 300 includes encoder 310, forward diffusion block 320, text-transformer 335, reverse diffusion block 345, and decoder 355. Reverse diffusion block 345 may be based on a U-net architecture. A U-net is a machine learning architecture that includes several down-sampling and up-sampling layers. An example of a U-net architecture will be described with reference to FIG. 8.

In an example process, text-transformer 335 processes input text 330 and generates text condition vector 340 as a sequence of features used for conditioning the diffusion model. The "text condition" information influences the generation of a final output image. The pretrained encoder 310 and decoder 355 convert images to and from latent space, respectively. For example, during either a training process or in cases where a user inputs a rudimentary starting image, encoder 310 converts starting image 305 from pixel space data to image vector 315 in latent space. Forward diffusion block 320 applies a noising process to generate noisy image vector 325, still in the latent space.

Reverse diffusion block 345 receives a time step t, noisy image vector 325, and text condition vector 340 as input to predict noise used to denoise noisy image vector 325. During fine-tuning of latent diffusion model 300, certain parameters of reverse diffusion block 345 corresponding to attention layers may be adjusted while other parameters are held constant. In this way, reverse diffusion block 345 is fine-tuned to learn particular denoising paths in order to generate new concepts.

After denoising, noisy image vector 325 becomes synthesized image vector 350, which contains all of the information and features required to reconstruct the final synthesized image. Decoder 355 then processes synthesized image vector 350 to produce synthesized image 360. FIG. 3 is provided as an example, however, the techniques described herein may be applied to any general diffusion model.

Image Generation

Fine-tuning and training operations will be described in greater detail with reference to FIGS. 6-11. Once fine-tuned, an image generation apparatus according to the present disclosure may be used to generate images. Further, the image generation apparatus can generate images of new concepts that were not included in its first training set.

Figure 4:
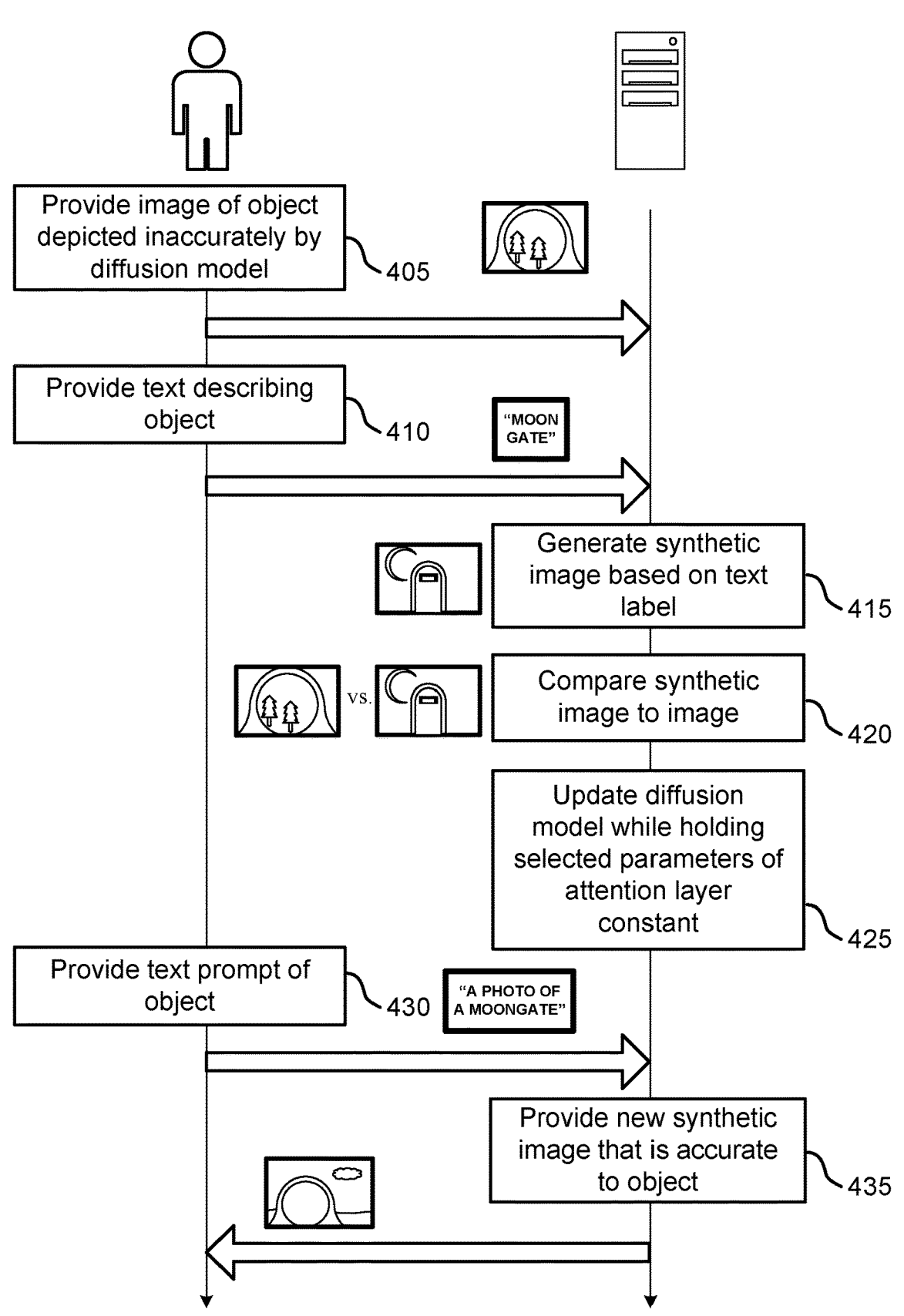
FIG. 4 shows an example of a method for generating an image accurate to an element according to aspects of the present disclosure.

FIG. 4 shows an example of a method 400 for generating an image accurate to an element according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, a user provides an image of an element depicted inaccurately by diffusion model. The user may upload or otherwise identify the image through a user interface, for example. The element might not have been included in the diffusion model's original training, and may be considered a "new concept" for the diffusion model. At operation 410, the user provides a text describing the element. To consider the example started above, the user may provide an image of a moongate, and provide a text "a photo of a moongate."

At operation 415, the system generates synthetic image based on text label. Since the system uses a diffusion model that has not yet learned about the moongate in this example, the synthetic image may be relatively inaccurate representation of the moongate. For example, the diffusion model may generate images of a gate that does not include a circular opening.

At operation 420, the system compares synthetic image to image. For example, a training component may measure the differences between the synthetic image and the image and generate a loss term. At operation 425, the system updates diffusion model while holding selected parameters of attention layer constant. For example, the training component may adjust selected parameters of the diffusion model to minimize the loss term.

At some point after fine-tuning, at operation 430, the user provides text prompt of element, such as "a photo of a moongate" or "a moongate in a desert," or similar. At operation 435, the system provides new synthetic image that is accurate to element. For example, at operation 435, the system may generate an accurate depiction of a moongate.

Figure 5:
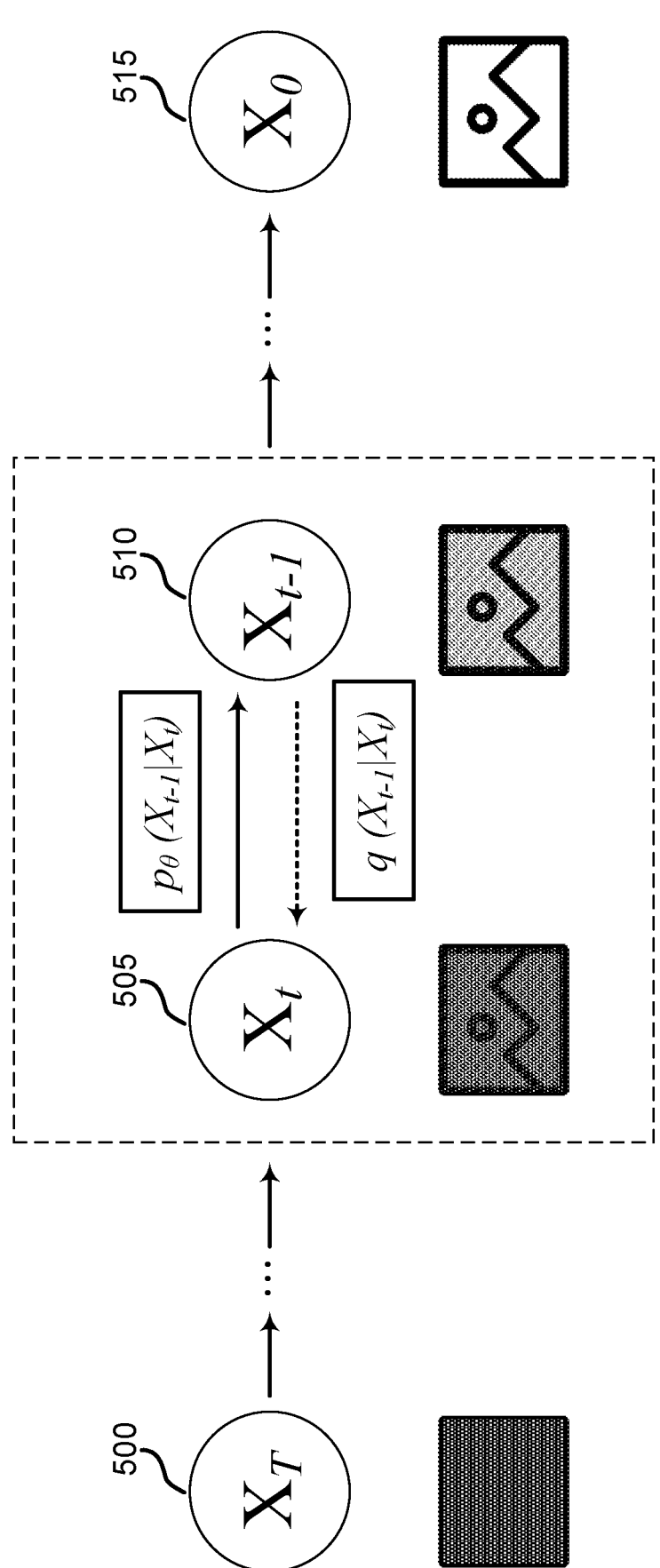
FIG. 5 shows an example diagram for describing the diffusion process according to aspects of the present disclosure.

FIG. 5 shows an example diagram for describing the diffusion process according to aspects of the present disclosure. The example shown includes pure noise image 500, sample at time t 505, sample at time t−1 510, and image 515. In some case, image 515 may correspond to an input image with low image quality. For example, some diffusion models receive an image as an initial input, such as a rough drawing of a desired final image. The following will describe forward and reverse diffusion processes.

At inference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality. The forward process is a fixed process where Gaussian noise is successively added to the latent variables $x_1, \ldots, x_{T-1}$ until a sample image of pure noise $x_T$, e.g. sample at time t 505, is obtained. Pure noise image 500 may be a decoding of sample at time t 505, which appears as an image of pure noise.

During the reverse process, with the learned time-dependent parameters of the Gaussian transitions, the diffusion model denoises the pure noise $x_T$ gradually by generating a sequence of samples gradually from time step t−1 to time step 1 in the Markov chain. In some examples, during the reverse process, the multiple layers in the U-Net are cross attention layers that apply cross attention mechanism to $x_{t-1}$ (i.e., the sample at time t−1 510) and t−1 to reverse $x_{t-1}$ until $x_1$ is reversed back to $\tilde{x}$. Additional information regarding the Markov chain and Gaussian noise, such as a likelihood $p_\theta$ and posterior q, will be described in greater detail later.

According to some embodiments, a guidance process (for example, generating images based on textual descriptions) can be applied to train a diffusion model to generate images in various conditional settings. Thus, in addition to the forward process and the reverse process, the diffusion models can include a conditioning process. In an example of a conditioning process, the diffusion model takes the guidance, for example, a semantic map or a text description, as input and generates vector representations based on the input. Next, the diffusion model generates an image $\tau_0$ based on the vector representations. In some cases, the image $\tau_0$ is concatenated with $x_T$ in the latent space to generate a new input for the reverse process.

Training and Data Sampling

Embodiments herein are configured to fine-tune a trained diffusion model. For example, an untrained diffusion model may be trained using a first training set during a first training phase. Once trained, the diffusion model can be further fine-tuned to learn additional concepts. For example, the diffusion model may be fine-tuned using a second training set during a second training phase, during which selected parameters of the diffusion model, e.g., attention block parameters, are adjusted while other parameters are held fixed.

A method for fine-tuning generative models is described. One or more aspects of the method include obtaining an input text indicating an element to be included in an image, and generating a synthetic image depicting the element based on the input text using a diffusion model trained by comparing synthetic images depicting the element to training images depicting elements similar the element and updating selected parameters corresponding to an attention layer of the diffusion model based on the comparison. Some examples of the method, apparatus, non-transitory computer readable medium, and system further include holding additional parameters of the diffusion model fixed while updating the selected parameters.

In some aspects, the selected parameters are limited to a cross-attention block, a self-attention block, or both. In some aspects, the selected parameters are limited to a projection mapping matrix of a cross-attention block. In some embodiments, the selected parameters are limited to a restricted set of parameters of the projection mapping matrix. The selected parameters may be limited to selected resolution levels of a U-Net architecture. In some cases, the selected parameters are limited to eigen-vectors or eigen-values of the attention blocks.

Some examples of the method, apparatus, non-transitory computer readable medium, and system further include identifying a semantic domain for improving performance of the diffusion model. Some examples further include selecting the training images based on the semantic domain, wherein the selected parameters of the diffusion model are updated based on the training set.

Some examples of the method, apparatus, non-transitory computer readable medium, and system further include encoding training images to obtain image features. Some examples further include adding noise to the image features to obtain noisy image features. Some examples further include generating de-noised image features from the noisy image features using the diffusion model. Some examples further include decoding the de-noised image features to obtain the synthetic images for training.

A method for fine-tuning generative models is described. One or more aspects of the method include identifying a diffusion model trained on a first training set during a first training phase; selecting a first subset of parameters of the diffusion model corresponding to an attention block and a second subset of parameters of the diffusion model outside of the attention block; and training the diffusion model to generate a synthetic image based on text condition features by fine-tuning the first subset of parameters of the diffusion model based on a second training set different from the first training set during a second training phase, wherein the second subset of parameters of the diffusion model are held fixed during the second training phase.

Some examples of the method, apparatus, non-transitory computer readable medium, and system further include identifying a semantic domain corresponding to a particular element, wherein the second training set includes a plurality of images representing the particular element. Some examples of the method, apparatus, non-transitory computer readable medium, and system further include identifying a semantic domain corresponding to a class of elements, wherein the second training set includes a plurality of images representing the class of elements.

Some examples of the method, apparatus, non-transitory computer readable medium, and system further include identifying an image from the first training set. Some examples further include encoding the image to obtain an encoded image. Some examples further include comparing the encoded image to a target encoding for the second training set, wherein the image is included in the second training set based on the comparison.

Some examples of the method, apparatus, non-transitory computer readable medium, and system further include identifying an image from the first training set and a caption corresponding to the image. Some examples further include encoding the caption to obtain an encoded caption. Some examples further include comparing the encoded caption to a target encoding for the second training set, wherein the image is included in the second training set based on the comparison. Some examples further include obtaining an input text. Some examples further include generating an output image based on the input text using the diffusion model during the second training phase, wherein the fine-tuning is based on the output image.

Conventionally used diffusion models may be trained on a fixed dataset X. As a result, there may be categories which the pretrained model cannot generate due to continuously evolving nature of images found on web, or the category being in the tail end of the training dataset X. The fine-tuning latent-diffusion method described herein can generate new concepts based on a few target images.

The diffusion model may be fine-tuned to maximize an objective and minimize a loss function. Given a pretrained generative model with parameters $\theta$ and a new dataset X', which includes a new concept for the model to learn, the image generation apparatus increases the likelihood of a new dataset within the generative model (e.g., the diffusion model) based on an objective function. In some cases, the model uses a pretrained generative model with parameters $\theta$ and a new dataset X' while maintaining the likelihood of old dataset X. The objective function is given as:

$$\Pi_i p(x'_i)\Pi_i p(x_i) \text{ where} \{x'_i \in X', x_i \in X\} \tag{1}$$

Thus, the training objective during finetuning is to minimize:

$$L_{X';\theta'} + \lambda * L_{X,\theta'} L_{X';\theta'} = \mathbb{E}_{\epsilon \in N(0,I),(x,C) \in X',t \in [0,T]} \| \epsilon - \epsilon_{\theta'}(x_t, C, t) \| \tag{2}$$

where $\theta'$ is the updated parameters. The original (or a sample of) training dataset X is included to ensure that the finetuned model does not overfit the target dataset and forget previously learned concepts. This is referred to as regularization. Some embodiments use a subset of training dataset X such that the subset contains data that is similar to the new concept being learned. For example, some embodiments choose data from training dataset X based on a semantic similarity or a cosine similarity to an embedding of a new concept.

Experiments that allow the model to adjust all of its parameters while minimizing $L_{X';\theta'}$ indicates that the most impactful changes occur in selected components of the U-net. In some cases, the median change is maximum for parameters in the attention layers. Accordingly, embodiments of the present application allow changes for parameters in the attention layers, and may hold other parameters fixed.

The attention module in the network consists of self-attention and cross-attention layers. The cross-attention layers modify the latent features of the network according to the input text condition. Given the text condition c and latent image features 1, cross attention consists of:

$$Q = W_q \cdot l \quad K = W_{to_k} \cdot c \quad K = W_{to_v} \cdot c \tag{3}$$

$$\text{Attention } (Q, K, V) =$$

$$\text{softmax}\left(\frac{Q \cdot K^T}{\sqrt{d}}\right) \cdot V = \text{out} = MLP(\text{Attention}(Q, K, V))$$

Figure 8:
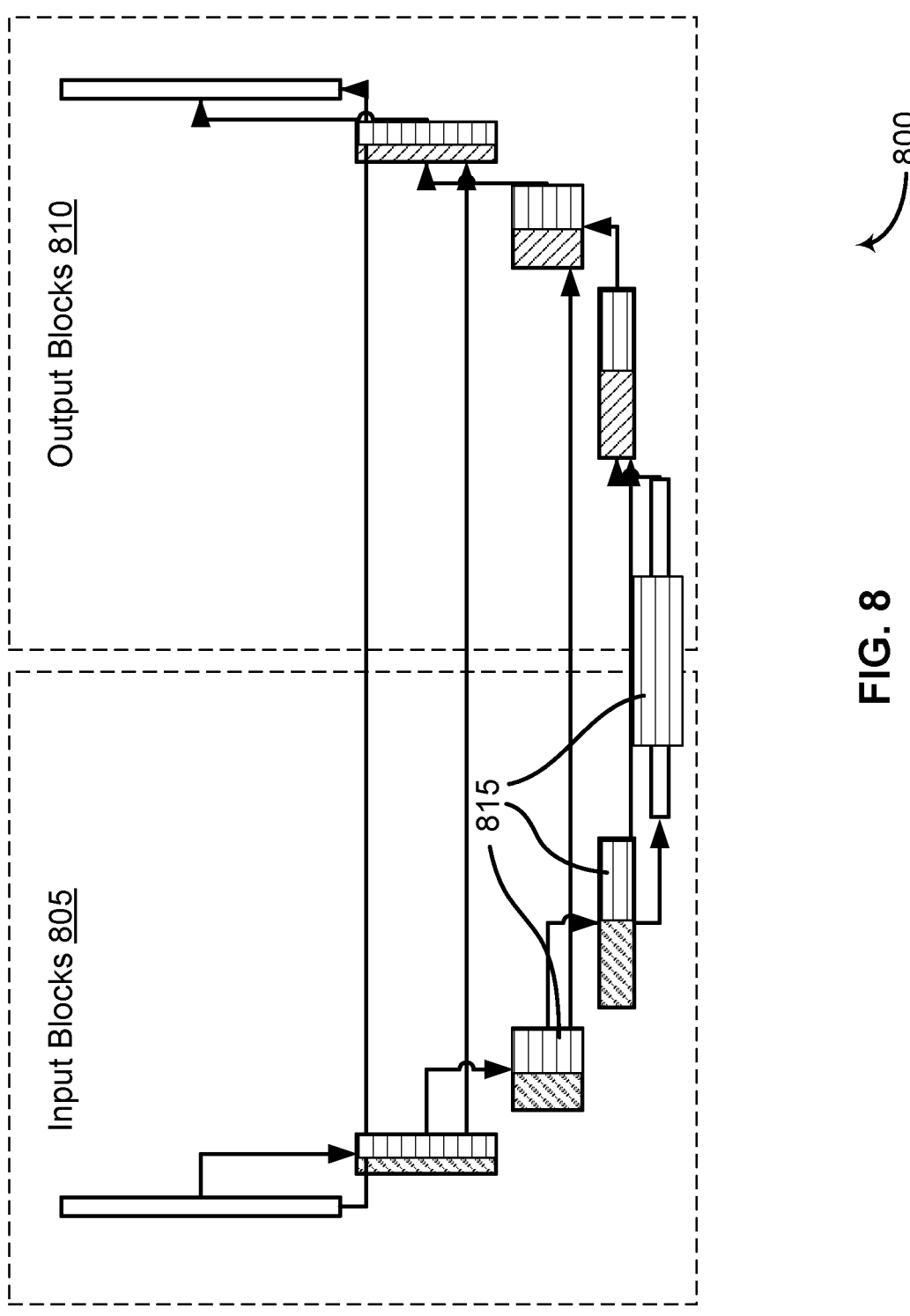
FIG. 8 shows an example of a u-net denoising architecture according to aspects of the present disclosure.

Some embodiments modify the $W_{to_k}$ and $W_{to_v}$ projection matrices during fine-tuning. Updating these matrices modifies the mapping from the input text-condition to the latent feature corresponding to each pixel in an output image. FIGS. 8 and 9 will provide greater detail regarding the parameters updated during the fine-tuning process.

FIG. 6 shows an example of a method 600 for fine-tuning a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system identifies an input text indicating an element to be included in an image. In some cases, the operations of this step refer to, or may be performed by, an image generation apparatus as described with reference to FIGS. 1 and 2. In some cases, a user may provide the image to the system using a user interface as described with reference to FIG. 2.

At operation 610, the system generates text condition features based on the input text. For example, a text transformer may generate an encoding of the text prompt that includes information from the text prompt, as well as weighted connections representing contextual information such as relationships among words in the text prompt.

At operation 615, the system generates a synthetic image using a diffusion model trained by comparing synthetic images depicting the element to training images depicting the element and updating selected parameters corresponding to an attention layer of the diffusion model based on the comparison. In some cases, the operations of this step refer to, or may be performed by, a diffusion model as described with reference to FIG. 2. The synthetic image may accurately represent a concept or element that was previously depicted inaccurately by the diffusion model.

A training component may compute a loss term that measures differences between the synthetic image and the image, which corresponds to an error of the diffusion model. The loss may correspond to, for example, the terms represented above in Equation 2. The selected parameters may correspond to the projection matrices as described above, though the disclosure is not limited thereto. In some embodiments, all parameters in the attention blocks are optimized. In some embodiments, the matrices are optimized with a constraint that the only updates allowed are low rank additions to the original matrices.

Diffusion models are trained on datasets which include a plurality of images. Generally, the diffusion model adds noise to an image from the training set, and then learns how to denoise the image to achieve the original image from the dataset.

In one example of a training process for a diffusion model, Gaussian noise is progressively added to an input image in multiple states. At each noise level, the model is trained to recover the image using a reconstruction loss function. That is, the training objective of the model is to learn the reverse process by generating values that maximize the likelihood of recovering the previous stage of noise. In some cases, this training objective is manifested by tuning the model parameters to minimize the variational upper bound of the negative log-likelihood of the training data.

Accordingly, training a diffusion model can include a forward process and a reverse process. In an example forward process for a latent diffusion model, the model maps an observed variable $x_0$ in a pixel space to latent variables $x_1, \ldots, x_T$ in a latent space using a Markov chain. The Markov chain gradually adds Gaussian noise to the data to obtain the approximate posterior $q(x_{1:T}|x_0)$ as the latent variables are passed through the multiple layers in the U-Net, where $x_1, \ldots, x_T$ are with the same dimensionality as $x_0$.

The neural network may be trained to perform the reverse process. During the reverse process, the model denoises the data to obtain the p $(x_{t-1}|x_t)$ in each time step $t-1$, where t represents the time step in the sequence of transitions associated with different noise levels. The diffusion model takes $x_{t-1}$ and $t-1$ as input. The model is applied to $x_{t-1}$ (i.e., the sample at time step $t-1$) and $t-1$ to reverse $x_{t-1}$ iteratively until $x_1$ is reverted back to $x_0$. The reverse process can be represented as:

$$p_\theta(x_{t-1}|x_t) := \mathcal{N}(x_{t-1};\mu_\theta(x_t,t),\Sigma_\theta(x_t,t)). \tag{4}$$

In some examples, the reverse process for each time step is learned individually by the diffusion model. The joint probability of a sequence of samples in the Markov chain can be written as a product of conditionals and the marginal probability:

$$x_T: \quad p_\theta(x_{0:T}) := p(x_T)\prod_{t=1}^{T} p_\theta(x_{t-1}|x_t), \tag{5}$$

where $p(x_T)=\mathcal{N}(x_T; 0, I)$ is the pure noise distribution as the reverse process takes the outcome of the forward process, a sample of pure noise, as input and $\prod_{t=1}^{T} p_\theta(x_{t-1}|x_t)$ represents a sequence of Gaussian transitions corresponding to a sequence of addition of Gaussian noise to the sample. Given observed data x, the diffusion model is trained to minimize the variational upper bound of the negative log-likelihood $-\log p_\theta(x)$ of the training data. The time-dependent parameters of the Gaussian transitions can also be learned.

Figure 7:
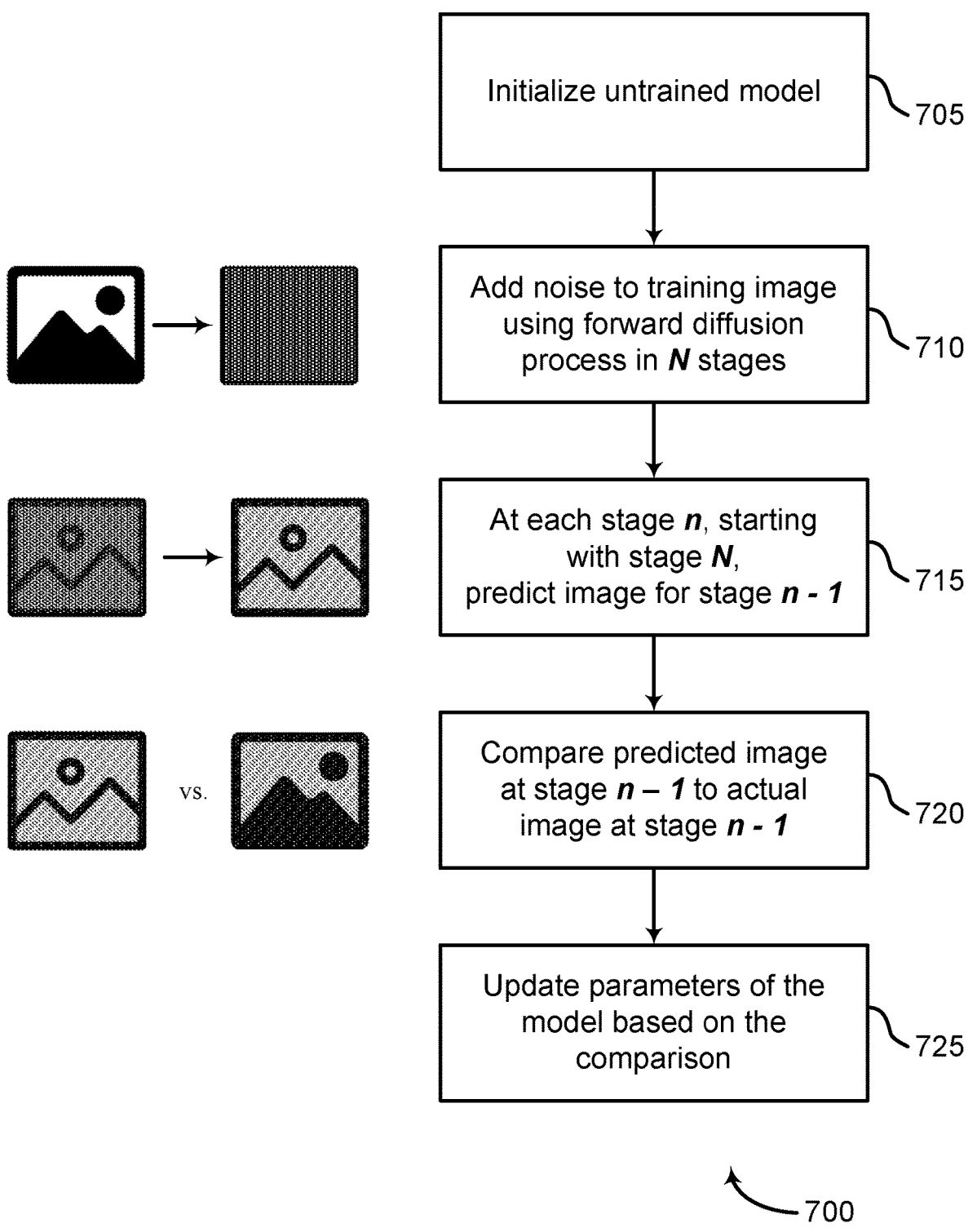
FIG. 7 shows an example of a method for training a diffusion model according to aspects of the present disclosure.

FIG. 7 shows an example of a method 700 for training a diffusion model according to aspects of the present disclosure. The method 700 is essentially the process described above with reference to Equations (4) and (5). In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system initializes an untrained model. Initialization can include creating the architecture of the model, defining the number of layers in certain blocks, the location of the blocks, skip connections, and the like.

At operation 710, the system adds noise to a training image using forward diffusion process in N stages. In some cases, the forward diffusion process is a fixed process where Gaussian noise is successively added to an image. In latent diffusion models, the Gaussian noise is successively added to latent variables.

At operation 715, the system at each stage n, starting with stage N, predicts image for stage n−1. At operation 720, the system compares predicted image at stage n−1 to an actual image at stage n−1. For example, the actual image may be a stored image with a noise level corresponding to that stage. At operation 725, the system updates parameters of the model based on the comparison.

In some examples, diffusion models are based on a convolutional neural network (CNN) architecture known as a U-Net. The U-Net includes a first set of convolutional layers separated by down-sampling layers and a corresponding second set of convolutional layers separated by upsampling layers. The first set of layers are connected to the second set of layers by skip connections. In some cases, diffusion models also include cross-attention layers between the convolutional layers.

FIG. 8 shows an example of a U-net 800 denoising architecture according to aspects of the present disclosure. The example shown includes U-net 800, input blocks 805, output blocks 810, and attention block 815. The U-net 800 enables the reverse diffusion process, which is the main generative process used in synthesizing new images.

The U-net 800 may include a plurality of down-sampling blocks within input blocks 805, and a plurality of up-sampling blocks within output blocks 810. As illustrated in the FIG. 8, in one example, attention blocks 815 are disposed in both down-sampling blocks and up-sampling blocks. In some cases, the down-sampling blocks each comprise one or more ResNet layers, an attention block, and one or more down-sampling layers. Similarly, in some cases, the up-sampling blocks each comprise one or more ResNet layers, an attention block, and one or more up-sampling layers.

FIG. 9 shows an example of a method 900 for training a diffusion model in two training phases according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system identifies a diffusion model trained on a first training set during a first training phase. In some cases, the operations of this step refer to, or may be performed by, an image generation apparatus as described with reference to FIGS. 1 and 2. For example, the image generation apparatus may incorporate the identified diffusion model as its generative model.

At operation 910, the system selects a first subset of parameters of the diffusion model corresponding to an attention block and a second subset of parameters of the diffusion model outside of the attention block. In some cases, the operations of this step refer to, or may be performed by, a training component as described with reference to FIG. 2.

In some cases, after operation 910, the system or a user identifies one or more concepts or elements that are inaccurately depicted by a model trained on the first training set during the first training phase. At operation 915, the system trains the diffusion model to generate a synthetic image based on text condition features by fine-tuning the first subset of parameters of the diffusion model based on a second training set different from the first training set during a second training phase, where the second subset of parameters of the diffusion model are held fixed during the second training phase. In some cases, the operations of this step refer to, or may be performed by, a training component as described with reference to FIG. 2.

Figure 10:
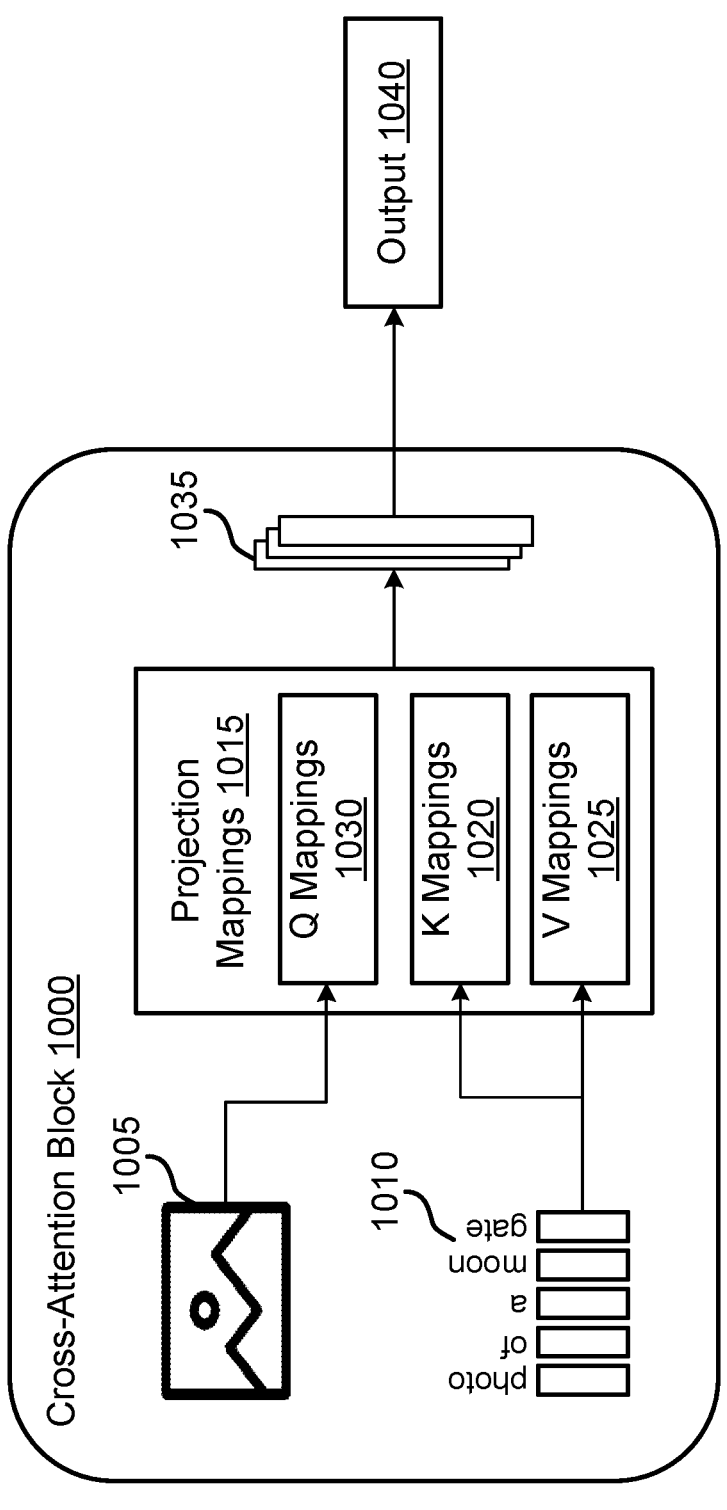
FIG. 10 shows an example of a cross-attention block according to aspects of the present disclosure.

FIG. 10 shows an example of a cross-attention block according to aspects of the present disclosure. The example shown includes cross-attention block 1000, pixel features 1005, text features 1010, projection mappings 1015, latent features 1035, and output 1040. Referring to FIG. 8, a cross attention block similar to cross-attention block 1000 may be included in one or more down-sampling or up-sampling blocks of a U-net architecture.

Cross-attention block 1000 may use projection mappings 1015 to map pixel features 1005 and text features 1010 to latent features 1035. Each latent feature of latent features 1035 may share the same latent space. In this example, projection mappings 1015 includes K mappings 1020, V mappings 1025, and Q mappings 1030.

In some aspects, Q mappings 1030 transform pixel features 1005 into a query vector. K mappings 1020 may transform text features 1010 into a key vector, and V mappings 1024 may transform the text features 1025 into a value vector. Projection mappings 1015 may include weights that are trained, enabling cross-attention between pixel features 1005 and text features 1010. In some embodiments, only K mappings 1020 and V mappings 1025 are trained during fine-tuning. In some embodiments, output 1040 is passed through a multi-layer perceptron (MLP) before being decoded to form a final image.

As discussed above, some embodiments include samples from a first training set in the second training set used during fine-tuning for regularization. In some cases, using the entire training dataset X for regularization during finetuning can be computationally costly and might not be fully utilized by the model. Further, experimental data indicates forgetting of concepts is maximized when finetuning for new concepts with text description similar to the target image. Accordingly, embodiments include images from the original training dataset that are similar to the new concepts are included during finetuning, so they are not forgotten. As a result, the finetuning latent-diffusion system selects images from the original training data X if the corresponding captions have similarity with the target text prompt. For example, the images with similarity higher than a threshold (e.g., 0.85) in a multimodal encoder feature space can be selected which prevents the model from forgetting similar concepts during finetuning on the target images.

FIG. 11 shows an example of a method 1100 for selecting training data according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system identifies an image from a first training set and a caption corresponding to the image. At operation 1110, the system encodes the caption to obtain an encoded caption. In some cases, the operations of this step refer to, or may be performed by, a text transformer as described with reference to FIGS. 2 and 3.

At operation 1115, the system compares the encoded caption to a target encoding for a second training set different from the first training set, where the image is included in the second training set based on the comparison. In some cases, the operations of this step refer to, or may be performed by, a training component as described with reference to FIG. 2. At operation 1120, the system fine-tunes the first subset of parameters of the diffusion model based on the second training set. In some cases, the operations of this step refer to, or may be performed by, a training component as described with reference to FIG. 2.

Figure 12:
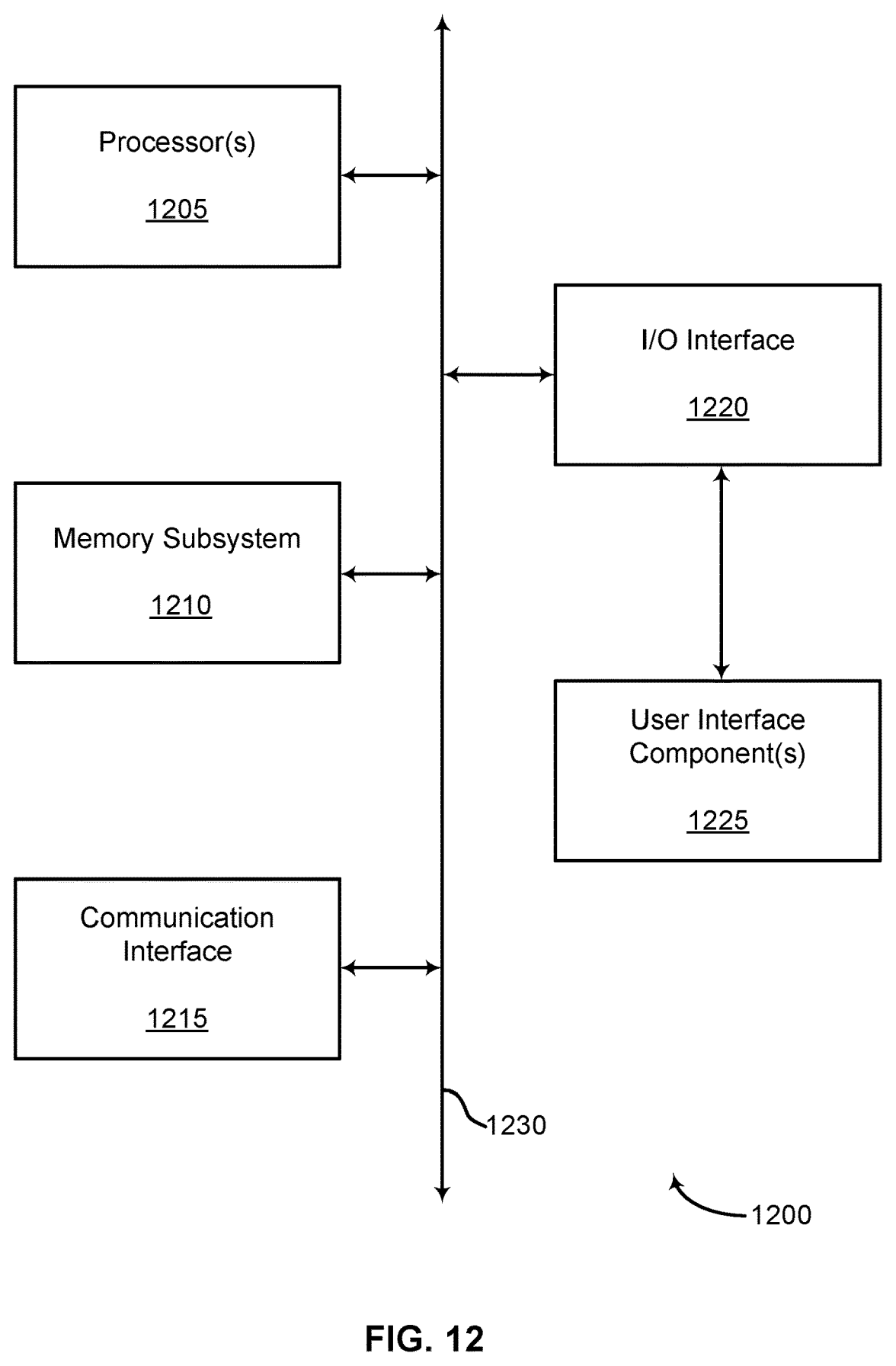

FIG. 12 shows an example of a computing device for generating synthetic images according to aspects of the present disclosure. In one aspect, computing device 1200 includes processor(s) 1205, memory subsystem 1210, communication interface 1215, I/O interface 1220, user interface component(s) 1225, and channel 1230.

In some embodiments, computing device 1200 is an example of, or includes aspects of, image generation apparatus 100 of FIG. 1. In some embodiments, computing device 1200 includes one or more processors 1205 that can execute instructions stored in memory subsystem 1210 to obtain an input text indicating an element to be included in an image; generate text condition features based on the input text; and generate a synthetic image using a diffusion model trained by comparing synthetic images depicting the element to training images depicting the element and updating selected parameters corresponding to an attention layer of the diffusion model based on the comparison.

According to some aspects, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. Some embodiments of memory subsystem 1210 are used to store data such as diffusion model parameters, latent representations, and image data. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some aspects, user interface component(s) 1225 enable a user to interact with computing device 1200. In some cases, user interface component(s) 1225 include an audio device, such as an external speaker system, an external display device such as a display screen, an input device (e.g., a remote control device interfaced with a user interface directly or through the I/O controller), or a combination thereof. In some cases, user interface component(s) 1225 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described components and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining an input text indicating an element to be included in an image, wherein the element belongs to a semantic domain; and
   generating a synthetic image depicting the element based on the input text using a diffusion model, wherein the diffusion model is trained by:

performing a first training phase, determining that the diffusion model generates inaccurate output in the semantic domain after the first training phase, and performing a second training phase to improve an accuracy of the diffusion model for generating images in the semantic domain by comparing synthetic images depicting the element to training images depicting elements similar to the element and updating selected parameters corresponding to a cross-attention block of an attention layer of the diffusion model based on the comparison while holding additional parameters of the cross-attention block fixed, and wherein the cross-attention block operates based on text features and image features.

2. The method of claim 1, wherein:

the selected parameters are limited to K mappings and V mappings of the cross-attention block.

3. The method of claim 1, wherein:

the selected parameters are limited to a projection mapping matrix of the cross-attention block.

4. The method of claim 3, wherein:

the selected parameters are limited to a restricted set of parameters of the projection mapping matrix.

5. The method of claim 1, wherein:

the selected parameters are limited to selected resolution levels of a U-Net architecture.

6. The method of claim 1, further comprising:

identifying the semantic domain for improving performance of the diffusion model; and selecting the training images based on the semantic domain.

7. The method of claim 1, further comprising:

encoding the training images to obtain the image features;

adding noise to the image features to obtain noisy image features;

generating de-noised image features from the noisy image features using the diffusion model; and decoding the de-noised image features to obtain the synthetic images for training.

8. A method comprising:

identifying a diffusion model trained on a first training set during a first training phase;

determining that the diffusion model generates inaccurate output in a semantic domain after the first training phase;

selecting, based on the determination, a first subset of parameters of the diffusion model corresponding to a cross-attention block of an attention layer and a second subset of parameters of the diffusion model outside of the cross-attention block; and training, based on the determination, the diffusion model to generate a synthetic image depicting an element in the semantic domain based on text condition features, wherein the training improves an accuracy of the diffusion model for generating images in the semantic domain by fine-tuning the first subset of parameters of the diffusion model based on a second training set that includes data in the semantic domain and is different from the first training set during a second training phase, wherein the first subset of parameters is fine-tuned based on comparing the synthetic image with the data in the semantic domain while holding the second subset of parameters of the cross-attention block fixed during the second training phase, and wherein the cross-attention block operates based on text features and image features.

9. The method of claim 8, further comprising:

identifying the semantic domain corresponding to the element, wherein the second training set includes a plurality of images representing the element.

10. The method of claim 8, further comprising:

identifying the semantic domain corresponding to a class of elements, wherein the second training set includes a plurality of images representing the class of elements.

11. The method of claim 8, further comprising:

identifying an image from the first training set;

encoding the image to obtain an encoded image; and comparing the encoded image to a target encoding for the second training set, wherein the image is included in the second training set based on the comparison of the encoded image to the target encoding.

12. The method of claim 8, further comprising:

identifying an image from the first training set and a caption corresponding to the image;

encoding the caption to obtain an encoded caption; and comparing the encoded caption to a target encoding for the second training set, wherein the image is included in the second training set based on the comparison of the encoded caption to the target encoding.

13. The method of claim 8, further comprising:

obtaining an input text; and generating an output image based on the input text using the diffusion model during the second training phase, wherein the fine-tuning is based on the output image.

14. An apparatus comprising:

one or more processors; and one or more memories including instructions executable by the one or more processors to:

generate text condition features from an input text using a text transformer model, wherein the input text indicates an element to be included in an image, and the element belongs to a semantic domain;

select images related to the input text; and generate synthetic images based on the text condition features using a diffusion model, wherein the diffusion model is trained by performing a first training phase, determining that the diffusion model generates inaccurate output in the semantic domain after the first training phase, and performing a second training phase to improve an accuracy of the diffusion model for generating images in the semantic domain by comparing synthetic images depicting the element to training images depicting elements similar to the element and updating selected parameters corresponding to a cross-attention block of one or more attention layers of the diffusion model based on the comparison while holding additional parameters of the cross-attention block fixed, and wherein the cross-attention block operates based on text features and image features.

15. The apparatus of claim 14, wherein the instructions are further executable to:

add noise to the images and the image features.

16. The apparatus of claim 14, wherein the instructions are further executable to:

fine-tune the diffusion model.

17. The apparatus of claim 14, wherein:

the diffusion model comprises a latent diffusion model.

18. The apparatus of claim 14, wherein:

the diffusion model comprises a U-net architecture.

19. The apparatus of claim 14, wherein:

the selected parameters are limited to K mappings and V
mappings of the cross-attention block.

* * * * *